US008185108B2

(12) United States Patent
Jung et al.

(10) Patent No.: US 8,185,108 B2
(45) Date of Patent: May 22, 2012

(54) MULTI-MODE COMMUNICATION SYSTEM AND METHOD THEREOF

(75) Inventors: Kwang-Ryul Jung, Daejeon (KR); Hye-Yeon Kwon, Daejeon (KR); Ae-Soon Park, Daejeon (KR)

(73) Assignees: Electronics and Telecommunications Research Institute, Daejeon (KR); SK Telecom Co., Ltd., Seoul (KR); KTFreetel Co., Ltd., Seoul (KR)

( * ) Notice: Subject to any disclaimer, the term of this patent is extended or adjusted under 35 U.S.C. 154(b) by 1062 days.

(21) Appl. No.: 12/067,909

(22) PCT Filed: Sep. 22, 2006

(86) PCT No.: PCT/KR2006/003766
§ 371 (c)(1),
(2), (4) Date: Mar. 24, 2008

(87) PCT Pub. No.: WO2007/035051
PCT Pub. Date: Mar. 29, 2007

(65) Prior Publication Data
US 2008/0207230 A1      Aug. 28, 2008

(30) Foreign Application Priority Data

Sep. 23, 2005   (KR) .................. 10-2005-0088724
Jun. 1, 2006    (KR) .................. 10-2006-0049256

(51) Int. Cl.
*H04L 12/66*     (2006.01)
*H04L 12/56*     (2006.01)
*H04L 12/28*     (2006.01)
(52) U.S. Cl. ............... 455/435.1; 455/458; 455/436
(58) Field of Classification Search .............. None
See application file for complete search history.

(56) References Cited

U.S. PATENT DOCUMENTS
5,826,173 A  * 10/1998  Dent ........................... 340/7.38
(Continued)

FOREIGN PATENT DOCUMENTS
EP            1 571 812 A2      2/2005
(Continued)

OTHER PUBLICATIONS
International Search Report (PCT/ISA/210) mailed Apr. 17, 2007 in connection with the International Application PCT/KR2006/003766.

*Primary Examiner* — Rafael Pérez-Gutiérrez
*Assistant Examiner* — Frank Donado
(74) *Attorney, Agent, or Firm* — Staas & Halsey LLP (57) ABSTRACT

The present invention relates to a multi-mode communication system and a method thereof. The multi-mode communication system uses a first mode among a plurality communication modes for accessing a first mobility control entity (MCE) among a plurality of MCEs, and communicates data with the first MCE. The multi-mode communication system receives a paging request that has been transmitted from a multi-mode control entity (MMCE) for accessing a second MCE from the first MCE and analyzes the paging request, and puts the first mode into a sleep mode and a second mode for accessing the second MCE into an awake mode based on the analysis. Subsequently, multi-mode UE accesses the second MCE by using the second mode in the awake mode. According to the present invention, an MMCE for multi-mode control is provided to integrate and manage an idle state for each access mode of multi-mode user equipment, thereby minimizing power consumption due to access of the multi-mode UE to a radio access system. In addition, a change of the access of the multi-mode UE to the radio access system due to a paging request can be efficiently performed.

16 Claims, 4 Drawing Sheets

U.S. PATENT DOCUMENTS

| | | | |
|---|---|---|---|
| 5,870,673 A * | 2/1999 | Haartsen | 455/426.1 |
| 6,167,283 A * | 12/2000 | Korpela et al. | 455/525 |
| 6,317,607 B1 * | 11/2001 | Tomcik et al. | 455/552.1 |
| 6,748,246 B1 * | 6/2004 | Khullar | 455/574 |
| 6,765,890 B1 * | 7/2004 | Palat et al. | 370/331 |
| 7,843,885 B2 * | 11/2010 | Lee et al. | 370/331 |
| 7,869,406 B2 * | 1/2011 | Kim et al. | 370/331 |
| 2002/0090975 A1 | 7/2002 | Laiho et al. | |
| 2002/0154627 A1 * | 10/2002 | Abrol et al. | 370/352 |
| 2004/0043798 A1 * | 3/2004 | Amerga et al. | 455/574 |
| 2004/0184436 A1 * | 9/2004 | Abrol et al. | 370/349 |
| 2005/0076254 A1 | 4/2005 | Robinson et al. | |
| 2005/0197125 A1 * | 9/2005 | Kang et al. | 455/439 |
| 2005/0213555 A1 * | 9/2005 | Eyuboglu et al. | 370/349 |
| 2005/0239441 A1 * | 10/2005 | Eronen | 455/411 |
| 2005/0276273 A1 * | 12/2005 | Oprescu-Surcobe et al. | 370/401 |
| 2006/0028986 A1 * | 2/2006 | Kwon et al. | 370/230 |
| 2006/0126582 A1 * | 6/2006 | Saifullah et al. | 370/338 |
| 2006/0187871 A1 * | 8/2006 | Jones | 370/328 |

FOREIGN PATENT DOCUMENTS

| | | |
|---|---|---|
| JP | 2001-69072 | 3/2001 |
| KR | 2001-0072785 | 7/2001 |
| KR | 10-2004-0075962 | 8/2004 |
| KR | 10-2005-0032243 | 4/2005 |

* cited by examiner

MULTI-MODE COMMUNICATION SYSTEM AND METHOD THEREOF

CROSS REFERENCE TO RELATED APPLICATIONS

This application claims the benefit under 35 U.S.C. Section 371, of PCT International Application Number PCT/KR2006/003766, filed Sep. 22, 2006 and Korean Application Nos. 10-2005-0088724 filed Sep. 23, 2005 and 10-2006-0049256 filed Jun. 1, 2006 in Korea, the contents of all of which are incorporated herein by reference.

BACKGROUND OF THE INVENTION

1. Technical Field

The present invention relates to a multi-mode communication system and a method thereof. More particularly, the present invention relates to a multi-mode communication system that can efficiently perform various types of wireless access.

2. Background Art

Power consumption is an issue for various wireless communication devices such as a conventional mobile communication terminal, a portable Internet terminal, a wireless personal area network (WPAN), or a sensor network node. Accordingly, the communication devices stay in an idle state when they are not in a communication state such that they can maintain a standby state while using a minimum amount of power when no data is communicated. This can be represented as sleep and awake, in which user equipment sleeps during the idle state while using the minimum amount of power and periodically wakes up for receiving and processing broadcasting information or paging information from a system. Therefore, the communication apparatus stays in the idle state after being applied with power and participates in minimal operation until receiving a user's request, and periodically wakes up at a predetermined time slot for receiving broadcasting information from a base station or a coordinator (i.e., an access point) and updating relevant information, and responds to the user's request.

The communication apparatus receives paging information from a base station or the coordinator at the corresponding time slot, compares a received ID and its own ID, and performs a paging response process when the two IDs are identical. In addition, the communication apparatus registers a new location with the coordinator when a location of the UE is changed as it moves to another location. However, a periodic pooling of the UE in the idle state causes power consumption of the communication apparatus due to state transition and data transmitting/receiving, and accordingly, an operation time of the UE is significantly reduced.

As described, when UE in which various wireless access techniques are integrated is used, that is, when multi-mode UE is used, the multi-mode UE must be periodically operated in accordance with respective idle states of all radio access systems that the multi-mode UE can access. Therefore, power of the multi-mode UE is more quickly exhausted since each radio access system has a different sleep/awake time. In the worst scenario, the multi-mode UE must be awake all the time, and accordingly, the purpose of the idle state becomes redundant.

Figure 1:
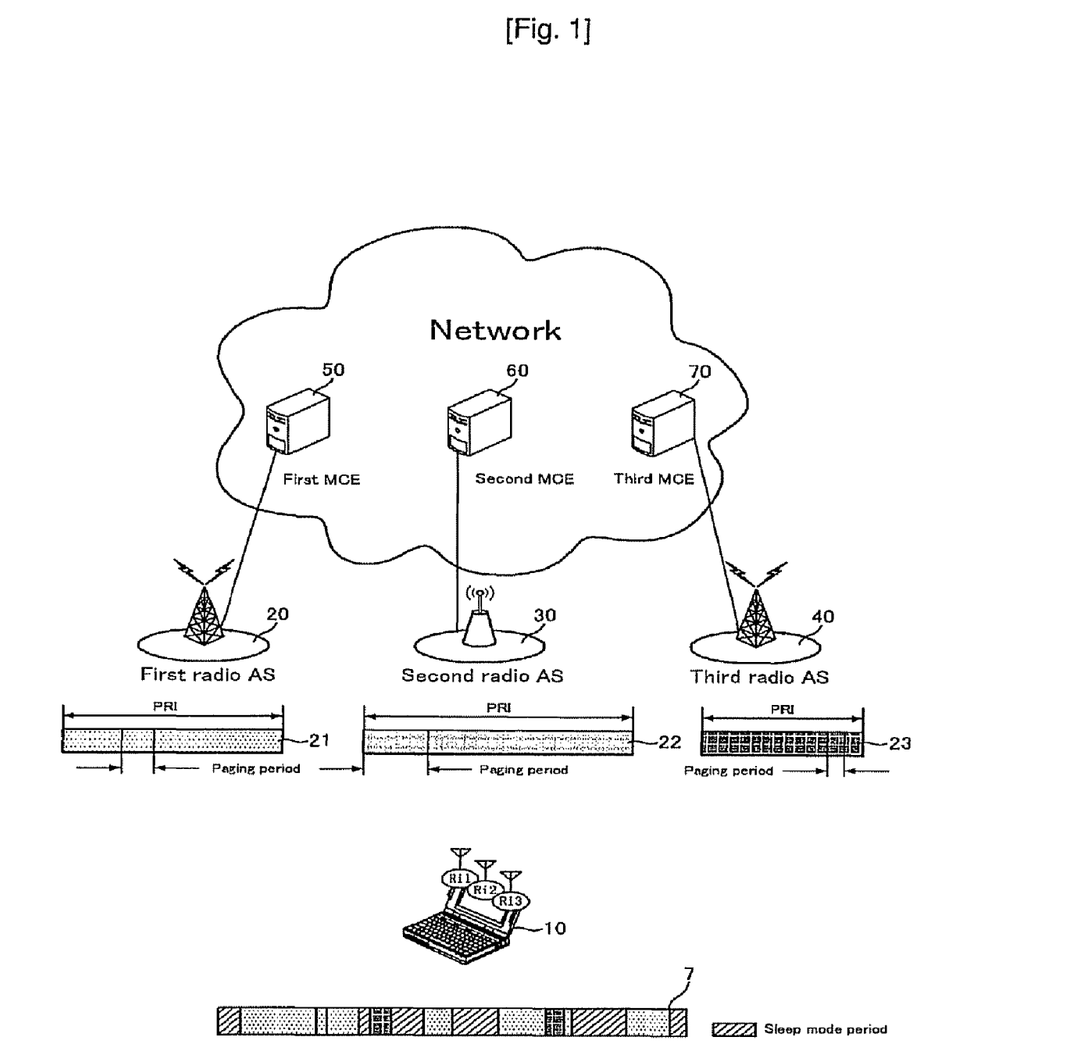
FIG. 1 is a block diagram of a conventional multi-mode wireless communication system that provides various wireless access modes.

FIG. 1 is a block diagram of a conventional multi-mode wireless communication system that provides various wireless access modes.

As shown in FIG. 1, a conventional multi-mode wireless communication system includes user equipment (UE) 10, a first radio access system (AS) 20, a second radio AS 30, a third radio AS 40, a first mobility control entity (MCE) 50, a second MCE 60, and a third MCE 70. The UE 10 includes a plurality of communication protocols and provides multi-mode communication, the first, second, and third radio ASs 20, 30, and 40 respectively perform wireless access in accordance with multi-mode selection of the UE 10, and the first, second, and third MCEs 50, 60, and 70 respectively perform mobility management of the UE 10, user authorization, and access control.

As shown in FIG. 1, the conventional multi-mode wireless communication system repeats a sleep/awake operation 7 according to communication periods (operation periods and paging periods) 21, 22, and 23 of the first, second, and third ASs 20, 30, and 40, and in the worst case, the conventional multi-mode wireless communication system stays in the awake state waiting for a process corresponding to a received message broadcasted through each radio access and a paging request, and therefore, advantages of the idle state cannot be realized and power is unnecessarily wasted.

Until now, no paging process has been provided for multi-mode UE, nor has a method for transmitting a paging message in a dual mode environment in which a radio access system such as a global system for mobile communication (GSM) system or a wireless code division multiplexing access (WCDMA) system uses the same mobile switching center (MSC) been suggested.

In the GSM system and the WCDMA system, a paging message is transmitted to an MSC that is commonly used for respective radio access systems, and the MSC adds information on a specific system that processes the paging message to the paging message and transmits the paging message to the respective radio access systems. The specific system may include a GSM system or a WCDMA system. When receiving the paging message from a radio access system that has been waiting to receive data or is currently being used, the multi-mode UE determines whether to respond to the paging message. When it is determined to respond to the paging message, the multi-mode UE transmits a paging response to a radio access system through which the GSM system or the WCDMA system requests and receives application services. However, this method has the following problems.

1. It is available only for the same type of systems (e.g., GSM system and WCDMA system) that can share an MSC.

2. It does not suggest a method for using various services by simultaneously using various radio access systems. (When a current service provided to an access system can be provided to a specific access system having received a paging message, a handover is performed from the current access system to the specific access system and thus both of the existing service and a paged service can be provided. Otherwise, the paging request is refused and only the existing service is served.)

3. There is no way of applying various Internet Protocol (IP)-based packet application policies since a paging control system located in the MSC only checks whether a service can be provided.

4. The MSC does not know which radio access system that the multi-mode UE in the idle state is waiting for, and thus the paging message must be transmitted to all the radio access systems involved with the multi-mode UE.

5. Since it is not informed which radio access system the multi-mode UE should access, power consumption of the multi-mode in the idle state cannot be efficiently managed.

Conventionally, there has been provided a method for processing a paging operation of multi-mode UE through a shared data transmission device (e.g., an MSC) in a mobile communication network, wherein the data transmission device can be shared within a core network. However, this method cannot be applied to a radio access system (e.g., a wireless local area network (WLAN) or a wireless wideband (WiBRO)) that cannot share the data transmission system, and information on currently waiting radio access systems cannot be provided.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a multi-mode communication system that can efficiently perform various types of radio access, and a method thereof.

Technical Solution

An exemplary multi-mode communication method according to one embodiment of the present invention is provided to multi-mode user equipment (UE) that provides multi-mode communication by control of a multi-mode control entity (MMCE) connected with a plurality of MCEs, wherein the multi-mode UE accesses a network through the MCEs. The multi-mode communication method includes: a) accessing a first MCE by using a first mode among a plurality of modes for accessing the plurality of MCEs; b) communicating data with the first MCE; c) receiving a paging request for accessing a second MCE from the first MCE, the paging request transmitted by the MMCE; d) analyzing the paging request, putting the first mode in a sleep state and waking up a second mode for accessing the second MCE according to the analysis; and e) accessing the second MCE by using the second mode in the awake state.

An exemplary multi-mode communication method according to another embodiment of the present invention provides multi-mode communication of multi-mode user equipment (UE) that accesses a plurality of MCEs. The multi-mode communication method includes: a) receiving information on an access state of the multi-mode UE, the access state information transmitted from a first MCE; b) storing the information in a table in which a state of the multi-mode UE is stored; c) receiving a paging request from a second MCE; d) searching through the table according to the paging request; and e) transmitting the paging request to the first MCE that is currently being used by the multi-mode UE in accordance with the table searching. In this case, the table stores awake mode information corresponding to the types of communication protocols and Internet Protocol (IP) address information used by the multi-mode UE.

An exemplary multi-mode accessing unit of a multi-mode communication system according to another embodiment of the present invention includes a first communication module, a second communication module, and an interworking control module. The multi-mode communication system accesses a network through a plurality of MCEs and provides multi-mode communication by an MMCE that accesses the MCEs. The first communication module has a first communication interface and accesses a first MCE. The second communication module has a second communication interface and accesses a second MCE. The interworking control module receives a specific paging request from the MMCE, analyzes the paging request, and accesses the first MCE or the second MCE by putting the first communication module or the second communication module into a sleep mode or an awake mode.

In this case, the interworking control module performs initial access by using a communication module that has the longest sleep interval among the first communication module or the second communication module.

Advantageous Effects

According to the above-stated configuration, the multi-mode communication system includes integrating idle states that vary according to an access mode of the multi-mode UE and managing the integrated idle states by using an MMCE, and accordingly, minimization of power consumption due to access to multiple radio access systems of the multi-mode UE can be achieved.

In addition, a change in access to the radio access system due to paging of the multi-mode UE of the multi-mode communication system can be efficiently performed.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, throughout this specification and the claims which follow, unless explicitly described to the contrary, the word "comprise" and variations such as "comprises" or "comprising" will be understood to imply the inclusion of stated elements but not the exclusion of any other elements.

In addition, throughout this specification and the claims which follow, a module means a unit that performs a specific function or operation, and can be realized by hardware or software, or a combination of both.

A multi-mode communication system and a method thereof according to an exemplary embodiment of the present invention will now be described with reference to the accompanying drawings.

Figure 2:
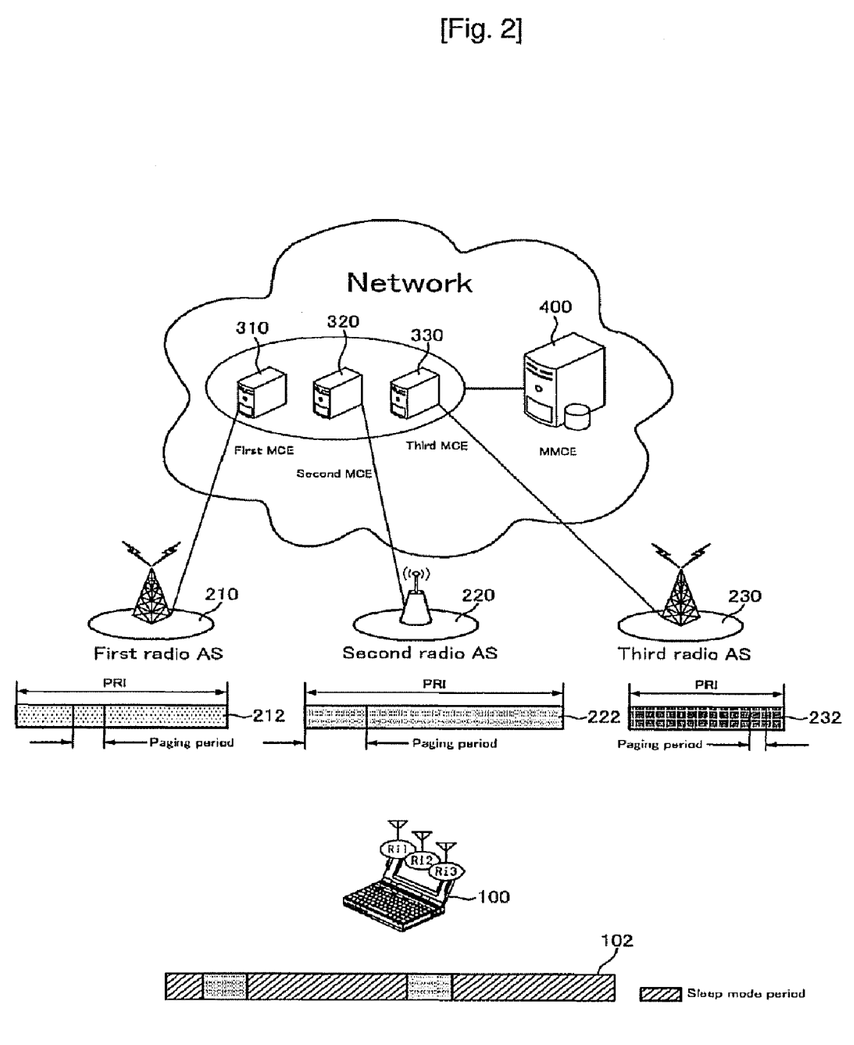
FIG. 2 is a block diagram of a multi-mode communication system according to an exemplary embodiment of the present invention.

FIG. 2 is a block diagram of a multi-mode communication system according to the exemplary embodiment of the present invention.

As shown in FIG. 2, the multi-mode communication system according to the exemplary embodiment of the present invention includes multi-mode user equipment (UE) 100, radio access systems (ASs) 210, 220, and 230, mobile control entities (MCEs) 310, 320, and 330, and a multi-mode control entity (MMCE) 400.

The multi-mode communication system according to the exemplary embodiment of the present invention uses three radio ASs 210, 220 and 230 and three MCEs 310, 320, and 330, and a wireless communication mode of the multi-mode UE 100 is described in three modes, but the number of wireless communication modes can be increased or decreased.

The multi-mode UE 100 has three radio access interfaces that perform a first communication, a second communication, and a third communication through three radio interfaces Ri1, Ri2, and Ri3 according to three different communication protocols, and changes communication mode in accordance with a paging request transmitted from an MCE. Herein, the multi-mode UE 100 is assigned three different IP addresses for the respective radio interface Ri1, Ri2, and Ri3 corresponding to the first, second, and third communications. In addition, the multi-mode UE 100 has a communication period 102 according to a communication period 222 of the radio AS 220 that the multi-mode 100 accesses. The communication period 222 includes an operation period and a paging period, and the multi-mode UE 100 has a sleep-mode period 102 according to the communication period 222 of the wireless AS 220.

The multi-mode UE 100 performs initial access to the radio ASs 210, 220, and 230 in accordance with an access scheme that consumes a minimum amount of power for the initial access. Herein, the access scheme used for the initial access has the longest sleep interval. In this case, although the multi-mode UE 100 according to the exemplary embodiment of the present invention performs the initial access based on the duration of a sleep mode, a user's decision, intensity of a received signal, or the last access information stored in a subscriber identify module (SIM) card may affect the performance of initial access.

The radio ASs 210, 220, and 230 are respectively controlled by the MCEs 310, 320, and 330 respectively connected thereto, have preferred communication periods 212, 222, and 223, respectively, and wirelessly communicate with the multi-mode UE according to a selected communication mode.

The MCEs 310, 320, and 330 are respectively connected with the corresponding radio ASs 210, 220, and 230, and manage mobility of the multi-mode UE 100 accessing the corresponding AS, user authorization, and access control. Particularly, each MCE 310, 320, and 330 generates state information of the multi-mode UE 100 that accesses the corresponding MCE and provides the state information to the multi-mode control entity 400. Herein, the state information of the multi-mode UE 100 includes IP information, communication protocol information, a current access state, and ID information.

The MMCE 400 is connected with the MCEs 310, 320, and 330, stores the state information transmitted from the multi-mode UE 100, generates a paging message in response to a paging request or a broadcasting request transmitted from another network and a paging request transmitted from the MCEs 310, 320, and 330, and transmits the paging message to the multi-mode UE 100 based on a table in which the state information of the multi-mode UE 100 is stored.

In addition, the MMCE 400 stores the state information of the multi-mode UE 100 in the form of a table as shown in Table 1 and manages the information.

TABLE 1

| Multi-mode UE | First communication module (protocol in use) | IP address | ID for first communication module | OFF (sleep) | ... |
|---|---|---|---|---|---|
| | Second communication module (protocol in use) | IP address | ID for second communication module | IDLE (awake) | ... |
| | Third communication module (protocol in use) | IP address | ID for third communication module | OFF (sleep) | ... |

Since the multi-mode communication system performs a sleep/awake operation corresponding to a main system rather than entire systems that the multi-mode communication system accesses, power consumption can be minimized and efficient paging can be achieved.

Figure 3:
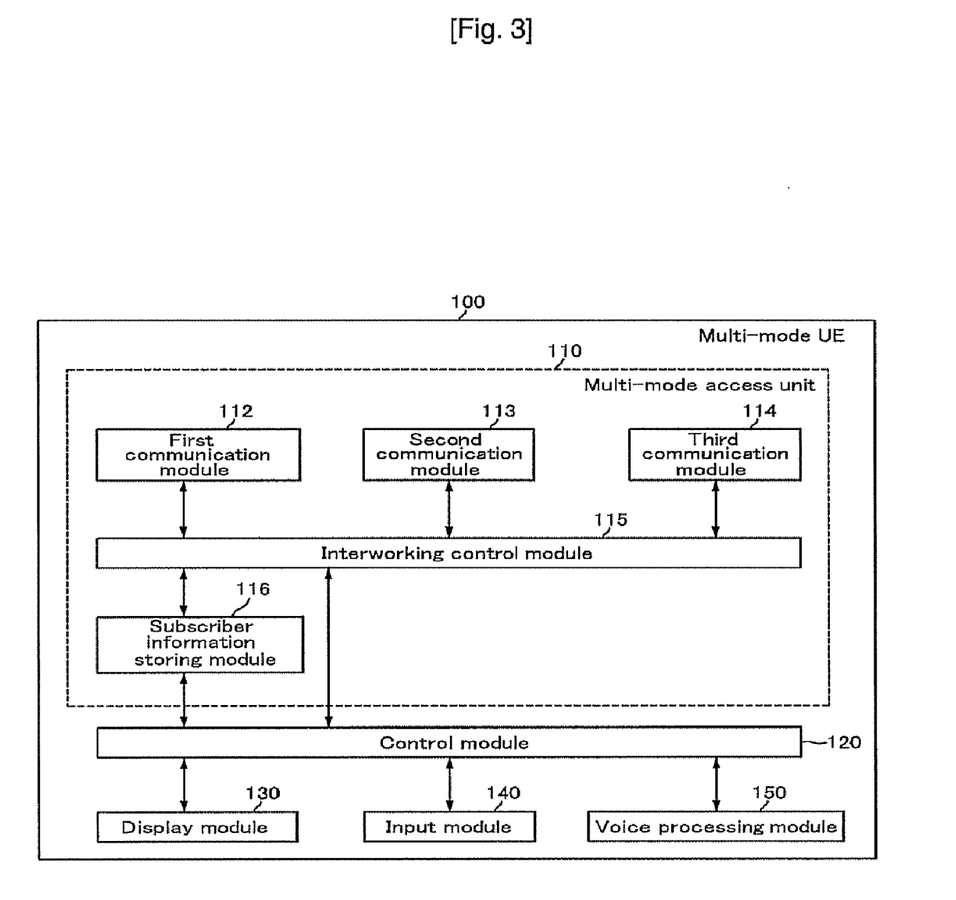
FIG. 3 is a block diagram of a multi-mode UE of the multi-mode communication system according to the exemplary embodiment of the present invention.

FIG. 3 is a detailed block diagram of the multi-mode communication system according to the exemplary embodiment of the present invention.

As shown in FIG. 3, the multi-mode UE 100 includes a multi-mode access unit 110, a control module 120, a display module 130, an input module 140, and a voice process module 150.

The multi-mode access unit 110 includes a first communication module 112, a second communication module 113, a third communication module 114, an interworking control module 115, and a subscriber information storing module 116, and it puts an awake communication module into a sleep state or wakes up a sleeping communication module according to a paging request of the MMCE 400 of FIG. 2. That is, the multi-mode access unit 110 can minimize power consumption by controlling the communication module in accordance with the paging request of the MMCE 400, thereby efficiently performing a paging operation.

The first communication module 112 includes a first radio interface (Ri1), and accesses the first radio AS 210 of FIG. 2 by using the corresponding communication protocol.

The second communication module 113 includes a second radio interface (Ri2), and accesses the second radio AS 220 of FIG. 2 by using the corresponding communication protocol.

The third communication module 114 includes a third radio interface (Ri3), and accesses the third radio AS 230 of FIG. 2 by using the corresponding communication protocol.

The subscriber information storing module 116 stores subscriber information. The subscriber information includes information (i.e., communication information on telecommunication companies, such as SKT, KTF, LGT, Hanaro, etc.) on a system with which a user is registered, information on cost for each access, information on mobility support for each access, subscriber ID information, and information on the last radio access system that the multi-mode UE 100 had accessed before being turned off. Herein, the subscriber information storing module 116 according to the exemplary embodiment of the present invention is installed as a form of a subscriber identity module (SIM) card in the multi-mode UE 100.

The interworking control module 115 controls the first communication module 112, the second communication module 113, the third communication module 114, and the subscriber information storing module 116, and controls the corresponding communication modules 112, 113, and 114 according to the paging request transmitted from the MMCE 400. That is, the interworking control module 115 changes a communication module according to the paging request transmitted from the MMCE 400 through a communication module used for current access, and accesses an MCE in accordance with the changed communication module. In this case, the interworking control module 115 receives the paging request, compares a received ID and its own ID, and performs a paging operation when the two IDs are identical.

In addition, the interworking control module 115 provides information stored in the subscriber information storing module 116 to the MCEs 310, 320, and 330 through the first, second, or third communication modules 112, 113, or 114 that has been accessing the radio access systems 210, 220, and 230 of FIG. 2.

The control module 120 controls an internal module of the multi-mode UE 100, and performs functions such as an application program control, an input/output control, and a voice process control.

The display module 130 provides processed information to a user in accordance with a control of the control module 120.

The input module 140 receives information from the user and forwards the information to the control module 120.

The voice process module 150 processes voice information transmitted from the control module 120 and provides the processed voice information to the user, and processes voice information from the user and provides the processed voice information to the control module 120.

Such multi-mode UE has merits of reducing power consumption and promptly responding to a paging request, and thus it wakes up a sleeping communication module or puts the awake communication module in the sleep mode according to the paging request that has been transmitted through a communication module in the awake mode.

A multi-mode communication method of the multi-mode communication system will now be described in more detail.

Figure 4:
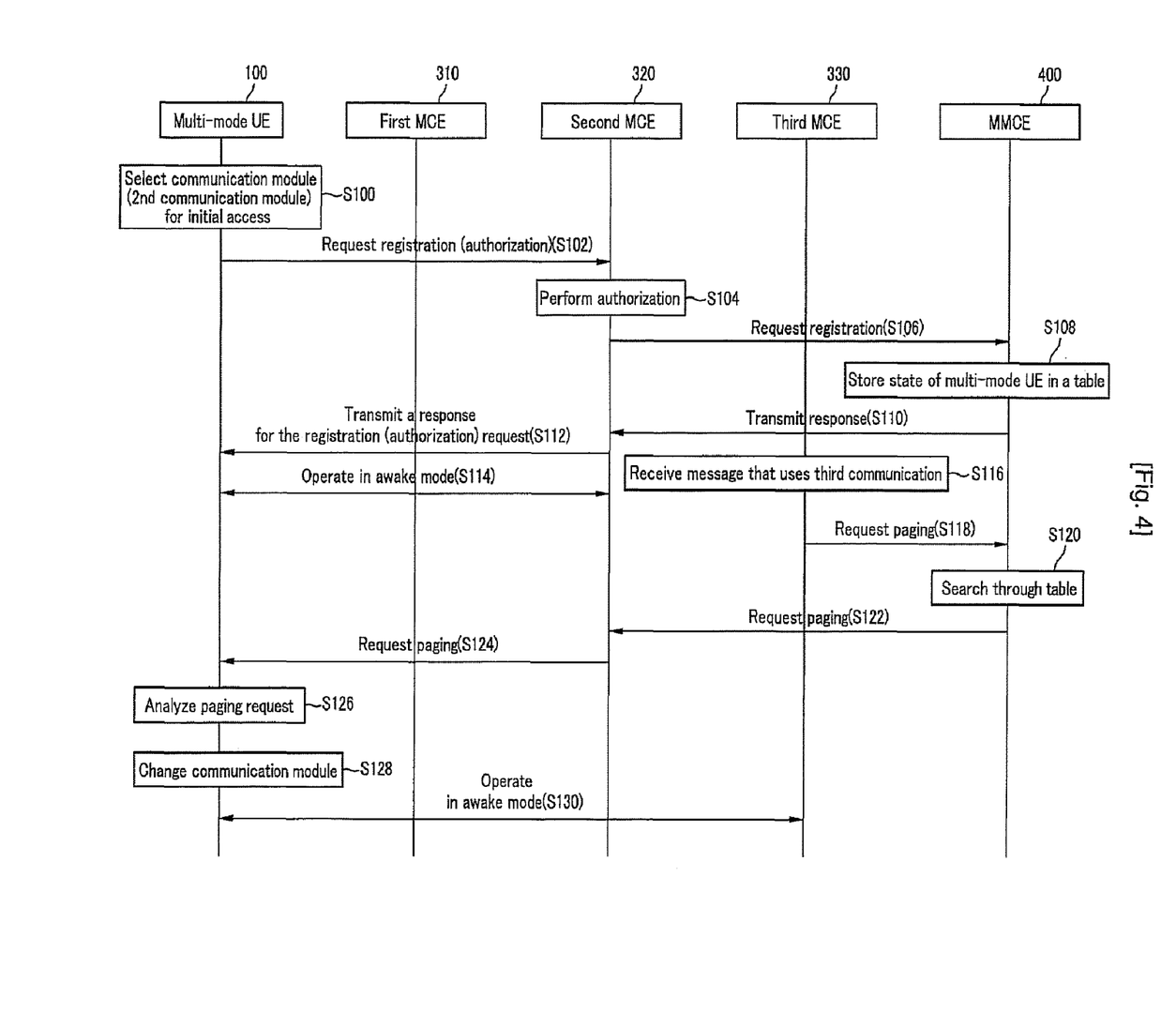
FIG. 4 is a flowchart showing a multi-mode communication method of the multi-mode communication system according to the exemplary embodiment of the present invention.

FIG. 4 is a data flowchart showing a multi-mode communication method of the multi-mode communication system according to an exemplary embodiment of the present invention.

As shown in FIG. 4, the multi-mode UE 100 that has been accessing the second MCE 320 changes a communication module in accordance with a paging request and accesses the third MCE 330.

Such a change of a radio access system according to a paging request will be described with reference to FIG. 4.

When being turned on, the multi-mode UE 100 selects a communication module for performing initial access. Then, the initial access is performed in accordance with an access scheme that consumes a minimal amount of power. That is, an access scheme having the longest sleep interval is used for the initial access. In this case, although the multi-mode UE 100 according to the exemplary embodiment of the present invention performs the initial access based on the duration of a sleep-mode, user's decision, intensity of a received signal, or final access information stored in a SIM may affect the decision of the access scheme.

The multi-mode UE 100 selects the second communication module for initial access in step S100, and transmits a registration (authorization) request message to the second MCE 320 in step S102. At this time, the registration (authorization) request message includes UE information stored in the multi-mode UE 100, the UE information including IP information, subscriber information, and medium access control (MAC) information.

The second MCE 320 performs authorization in response to the registration (authorization) request transmitted from the multi-mode UE 100 in step S104, and requests registration of the multi-mode UE 100 from the MMCE 400 in step S106. In this case, the registration request transmitted to the multi-mode UE 100 from the second MCE 320 includes multi-mode UE state information such as IP information, communication protocol information, and current access state information.

In addition, the second MCE 320 registers the authorized multi-mode UE 100 as UE to be managed, and manages the multi-mode UE.

The MMCE 400 stores the information on the state of the multi-mode UE 100 in the table according to the registration request in step S108, and transmits a response to the MCE 320 in response to the registration request in step S110. In this case, the MMCE 400 stores information on the multi-mode UE 100 in the table for managing the multi-mode UE 100.

When receiving the response from the MMCE 400 and perceiving that the registration has been completed, the second MCE 200 transmits a response to the multi-mode UE 100 in response to the registration (authorization) request in order to inform the completion of the registration in step S112.

The multi-mode UE 100 operates with the second MCE 320 in the awake mode according to the response to the registration (authorization) request, and communicates data with the second MCE 320 in step S114. In this case, all the communication modules, excluding the second communication module 320 that accesses the second MCE 32, are in the sleep mode.

The MMCE 400 receives a broadcasting message or a paging request transmitted from another network, or receives a paging request from the third MCE 330 in step S118. In this case, the paging request transmitted from the third MCE 330 is formed by a message received from another UE that uses the third communication, in step S116.

The MMCE 400 analyzes the received paging request and searches through the table in step S120, and transmits a paging request to the second MCE 320 that is currently being used by the multi-mode UE 100 according to the search of the table in step S122. In this case, the paging request transmitted to the second MCE 320 from the MMCE 400 includes paging information for using the third communication.

The second MCE 320 receives the paging request from the MMCE 400, and transmits the received paging request to the multi-mode UE 100 in step S124.

The multi-mode UE 100 receives and analyzes the paging request in step S126, and puts the third communication module in the awake mode and the second communication in current use into the sleep mode based on paging information included in the paging request such that the communication module is changed, in step S128. Herein, the paging information includes information for using the third communication. In this case, the multi-mode UE 100 receives the paging request, compares a received ID and its own ID, and performs a paging process when the two IDs are identical.

In addition, the multi-mode UE 100 operates in the awake mode with the third MCE 330 and communicates data with the third MCE 330, in step S130.

According to such a multi-mode communication method, the multi-mode UE changes a radio access system in the awake mode in accordance with a paging request transmitted from the MMCE, and accordingly, power consumption can be efficiently reduced and a paging operation can be efficiently performed.

The above-described exemplary embodiment of the present invention may be realized by an apparatus and a method, but it may also be realized by a program that realizes functions corresponding to configurations of the exemplary embodiment or a recording medium that records the program. Such a realization can be easily performed by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A multi-mode communication method of multi-mode user equipment (UE) that provides multi-mode communication by control of a multi-mode control entity (MMCE) connected with a plurality of mobile control entities (MCEs), the multi-mode UE accessing a network through the plurality of MCEs, the multi-mode communication method comprising:

accessing a first MCE by using a first mode among a plurality of modes for accessing the plurality of MCEs;

transmitting a registration request message to the first MCE so that the first MCE requests registration of the multi-mode UE to the MMCE;

forwarding a paging request, which is originally transmitted by a second MCE utilizing a second mode of communication in accordance with access state information of the multi-mode UE associated with the first MCE utilizing a first mode of communication;

receiving, by said multi-mode UE, said paging request for accessing a second MCE from the first MCE, the paging request being transmitted by the MMCE;

analyzing the paging request, putting the first mode in a sleep state and waking up a second mode for accessing the second MCE according to the analysis; and accessing the second MCE by using the second mode in the awake state.

2. The multi-mode communication method of claim 1, wherein the accessing the first MCE comprises:

after accessing the first MCE, transmitting user equipment (UE) information that includes Internet Protocol (IP) information, subscriber information, and medium access control (MAC) information; and receiving a response message from the first MCE according to the storing of the UE information.

3. The multi-mode communication method of claim 2, wherein the receiving comprises comparing a received identifier (ID) included in the paging request and a stored ID and analyzing the paging request when the two IDs are identical.

4. The multi-mode communication method of claim 1, wherein the receiving comprises comparing a received identifier (ID) included in the paging request and a stored ID and analyzing the paging request when the two IDs are identical.

5. The multi-mode communication method of claim 1, wherein in the accessing the first MCE, the first mode is determined by using a mode having the longest sleep interval among the plurality of modes so as to access the first MCE among the plurality of MCEs.

6. The multi-mode communication method of claim 3, wherein when the first mode is determined, a user's decision, a signal receiving strength, or final access information stored in a subscriber identify module (SIM) is used for accessing the first MCE among the plurality of MCEs.

7. A multi-mode communication method of a multi-mode communication system that provides multi-mode communication of multi-mode user equipment (UE) that accesses a plurality of mobile control entities (MCEs), the multi-mode communication method comprising:

transmitting a registration request message to a first MCE so that the first MCE requests registration of the multi-mode UE to a multi-mode control entity (MMCE);

receiving, by said MMCE, information on an access state of the multi-mode UE, the access state information being transmitted from the first MCE utilizing a first mode of communication;

storing the information in a table in which a state of the multi-mode UE is stored;

receiving, by said MMCE, a paging request from a second MCE utilizing a second mode of communication;

searching through the table according to the paging request;

transmitting the paging request to the first MCE that is currently being used by the multi-mode UE in accordance with the table searching;

receiving, by said multi-mode UE, said paging request for accessing a second MCE from the first MCE;

analyzing, by said multi-mode UE, the paging request, putting the first mode in a sleep state and waking up second mode for accessing the second MCE according to the analysis; and accessing the second MCE by using the second mode in the awake state.

8. The multi-mode communication method of claim 7, wherein the table stores awake mode information corresponding to the communication protocol types and Internet Protocol (IP) address information used by the multi-mode UE.

9. A multi-mode accessing unit of a multi-mode communication system that accesses a network through a plurality of mobile control entities (MCEs) and provides multi-mode communication by a control of a multi-mode control entity (MMCE) connected with the MCEs, the multi-mode accessing unit comprising:

a first communication module having a first communication interface and accessing a first MCE;

a second communication module having a second communication interface and accessing a second MCE;

an interworking control module for receiving and analyzing a specific paging request from the MMCE, and accessing the first MCE or the second MCE by putting the first communication module or the second communication module into a sleep mode or an awake mode, wherein, if the multi-mode accessing unit accesses one MCE among the first MCE and the second MCE, the interworking control module transmits a registration request message to the one MCE so that the one MCE requests registration of the multi-mode accessing unit to the MMCE;

and said page request is received in accordance with access state information of the multi-mode accessing unit associated with the first MCE utilizing said first or second mode of communication.

10. The multi-mode accessing unit of claim 7, wherein the interworking control module performs initial access by using a communication module that has the longest sleep interval among the first communication module or the second communication module.

11. The multi-mode accessing unit of claim 8, wherein the initial access is performed in accordance with a user's decision, a signal receiving strength, or stored final access information.

12. The multi-mode accessing unit of claim 10, wherein the interworking control module wakes up the corresponding communication module, and puts other communication modules, excluding the corresponding communication module, into a sleep mode according to the analysis.

13. The multi-mode accessing unit of claim 10, further comprising a subscriber information storing module controlled by the interworking control module, and storing information in a system with which a user is registered, information on cost for each access, information on mobility support for each access, a user ID, and information on the last MCE that user equipment has accessed before the UE is turned off.

14. The multi-mode accessing unit of claim 7, wherein the interworking control module wakes up the corresponding communication module, and puts other communication modules, excluding the corresponding communication module, into a sleep mode according to the analysis.

15. The multi-mode accessing unit of claim 14, wherein the interworking control module receives the specific paging request, compares a received ID and a stored ID, and performs a control corresponding to the first communication module or the second communication module according to the paging request when the two IDs are identical.

16. The multi-mode accessing unit of claim 9, further comprising a subscriber information storing module controlled by the interworking control module, and storing information in a system with which a user is registered, information on cost for each access, information on mobility support for each access, a user ID, and information on the last MCE that user equipment has accessed before the UE is turned off.

* * * * *